US010367416B2

(12) United States Patent
Kuppusamy et al.

(10) Patent No.: US 10,367,416 B2
(45) Date of Patent: Jul. 30, 2019

(54) METHOD AND SYSTEM FOR MAINTAINING OUTPUT VOLTAGE REGULATION OF A NON-SYNCHRONOUS SWITCHING REGULATOR PROVIDING VOLTAGE SUPPLY TO A MAIN LOAD

(71) Applicant: MOTOROLA SOLUTIONS, INC., Chicago, IL (US)

(72) Inventors: Anbuselvan Kuppusamy, Weston, FL (US); James L. Stephens, Pembroke Pines, FL (US); Jose E. Sanchez, Miami, FL (US); Mark A. Giles, Plantation, FL (US); Peter J. Bartels, Loxahatchee, FL (US); Wesley M. Lenzen, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/667,432

(22) Filed: Aug. 2, 2017

(65) Prior Publication Data

US 2019/0044441 A1   Feb. 7, 2019

(51) Int. Cl.
*H02M 3/157*    (2006.01)
*H02M 3/158*    (2006.01)
*H02M 1/15*     (2006.01)
*H02M 1/00*     (2006.01)
*H02M 3/156*    (2006.01)

(52) U.S. Cl.
CPC .............. *H02M 3/157* (2013.01); *H02M 1/15* (2013.01); *H02M 3/1582* (2013.01); *H02M 3/1584* (2013.01); *H02M 2001/0012* (2013.01); *H02M 2001/0032* (2013.01); *H02M 2003/1566* (2013.01); *Y02B 70/16* (2013.01)

(58) Field of Classification Search
CPC .. H02M 3/157; H02M 3/1582; H02M 3/1584; H02M 2001/0012; H02M 2001/0032; H02M 1/15; H02M 2003/1566; Y02B 70/16
See application file for complete search history.

(56) References Cited

U.S. PATENT DOCUMENTS 4,816,821 A * 3/1989 Losel ................ H02M 3/33561
                                              323/284
5,889,392 A * 3/1999 Moore ................. H02M 3/1588
                                              323/282

(Continued)

OTHER PUBLICATIONS

"Load Transient Response Testing for Voltage Regulators", Application Note, Linear Technology, Oct. 2006.*

*Primary Examiner* — Adolf D Berhane
*Assistant Examiner* — Jye-June Lee
(74) *Attorney, Agent, or Firm* — Michael Best & Friedrich LLP

(57) ABSTRACT

Method and system for maintaining output voltage regulation of a non-synchronous switching regulator providing a voltage supply to a main load. The method includes determining, using an electronic processor, that the main load is transitioning from a first load state to a second load state. The method also includes connecting, using the electronic processor, a switchable load to the non-synchronous switching regulator in response to determining that the main load is transitioning from the first load state to the second load state.

6 Claims, 5 Drawing Sheets

(56) References Cited

U.S. PATENT DOCUMENTS

| | | | | |
|---|---|---|---|---|
| 6,153,949 | A | * 11/2000 | Soderhall | H02J 7/0065 |
| | | | | 307/125 |
| 7,251,113 | B1 | 7/2007 | Batarseh et al. | |
| 8,203,812 | B2 | 6/2012 | Su | |
| 8,541,993 | B2 | 9/2013 | Notman et al. | |
| 8,816,757 | B1 * | 8/2014 | Yabbo | H02M 3/156 |
| | | | | 327/538 |
| 2002/0173338 | A1 * | 11/2002 | Neumann | H04M 1/725 |
| | | | | 455/552.1 |
| 2006/0176029 | A1 | 4/2006 | McGinty et al. | |
| 2007/0210772 | A1 | 9/2007 | Sawtell | |
| 2017/0187199 | A1 * | 6/2017 | Wei | H02J 7/007 |

\* cited by examiner

METHOD AND SYSTEM FOR MAINTAINING OUTPUT VOLTAGE REGULATION OF A NON-SYNCHRONOUS SWITCHING REGULATOR PROVIDING VOLTAGE SUPPLY TO A MAIN LOAD

BACKGROUND OF THE INVENTION

Non-synchronous switching regulators are connected between a power source and a component and are used to up-convert or down-convert an input voltage in electronic devices. During periods where the component has no load or almost no load, the switching regulator goes into a sleep state to increase power transfer efficiency and to conserve energy. The switching regulator turns back on when a load is detected at the component.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
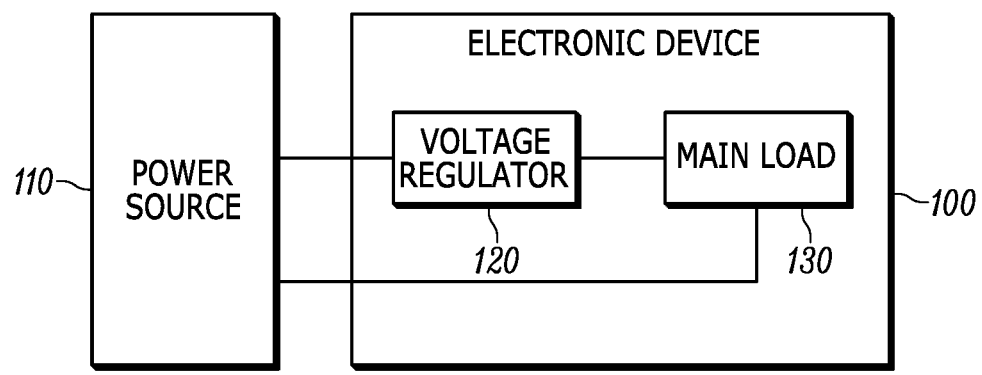
FIG. 1 is a block diagram of an electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

In electronic devices where the components have fast varying load conditions (that is, faster than a response time of the switching regulator), the switching regulator may lose output voltage regulation or may cause higher than normal peak currents.

One embodiment provides a method for maintaining output voltage regulation of a non-synchronous switching regulator providing a voltage supply to a main load. The method includes determining, using an electronic processor, that the main load is transitioning from a first load state to a second load state. The method also includes connecting, using the electronic processor, a switchable load to the non-synchronous switching regulator in response to determining that the main load is transitioning from the first load state to the second load state.

Another embodiment provides a voltage regulator for maintaining output voltage regulation to a main load. The voltage regulator includes a non-synchronous switching regulator providing a voltage supply to the main load and a switchable load controllable to be selectively connected to the non-synchronous switching regulator. The voltage regulator also includes an electronic processor controlling the non-synchronous switching regulator and the switchable load. The electronic processor is configured to determine that the main load is transitioning from a first load state to a second load state. The electronic processor is also configured to connect the switchable load to the non-synchronous switching regulator in response to determining that the main load is transitioning from the first load state to the second load state.

Another embodiment provides a method for maintaining output voltage regulation of a non-synchronous switching regulator providing a voltage supply to a main load. The method includes receiving, at an electronic processor, battery health information of a battery and determining, using the electronic processor, a current drain headroom of the battery based on the battery health information. The method also includes identifying, using the electronic processor, an activity to be performed by a device coupled to the battery, the device including the non-synchronous switching regulator and the main load and determining, using the electronic processor, an expected peak current for the activity. The method further includes determining, using the electronic processor, that the current drain headroom is less than the expected peak current for the activity and pre-loading, using the electronic processor, the non-synchronous switching regulator in response to determining that the current drain headroom is less than the expected peak current for the activity.

Another embodiment provides a voltage regulator for maintaining output voltage regulation to a main load. The voltage regulator includes a non-synchronous switching regulator providing a voltage supply to the main load and a switchable load controllable to be selectively connected to the non-synchronous switching regulator. The voltage regulator also includes an electronic processor controlling the non-synchronous switching regulator and the switchable load. The electronic processor is configured to receive battery health information of a battery and determine a current drain headroom of the battery based on the battery health information. The electronic processor is also configured to identify an activity to be performed by a device coupled to the battery, the device including the non-synchronous switching regulator and the main load and determine an expected peak current for the activity. The electronic processor is further configured to determine that the current drain headroom is less than the expected peak current for the activity and pre-load the non-synchronous switching regulator in response to determining that the current drain headroom is less than the expected peak current for the activity.

FIG. 1 is a block diagram of one embodiment of an electronic device 100. The electronic device 100 may be, for example, a vehicle-mounted two-way radio, a mobile two-way radio, a motorized device, a medical imaging device, a laptop computer, a tablet computer, a smart telephone or the like that receives operating power from a power source 110 such as, a battery, a vehicle battery, an AC outlet and the like. In the example illustrated, the electronic device 100 includes a voltage regulator 120 and a main load 130. The main load 130 is, for example, a transceiver, a transmitter (for example, a time-division multiple access (TDMA) transmitter), a receiver, a variable torque motor, a pulsed radio frequency component of a medical imaging device, and the like. The electronic device 100 may include more or fewer components and may perform additional functions other than those described herein.

Figure 2:
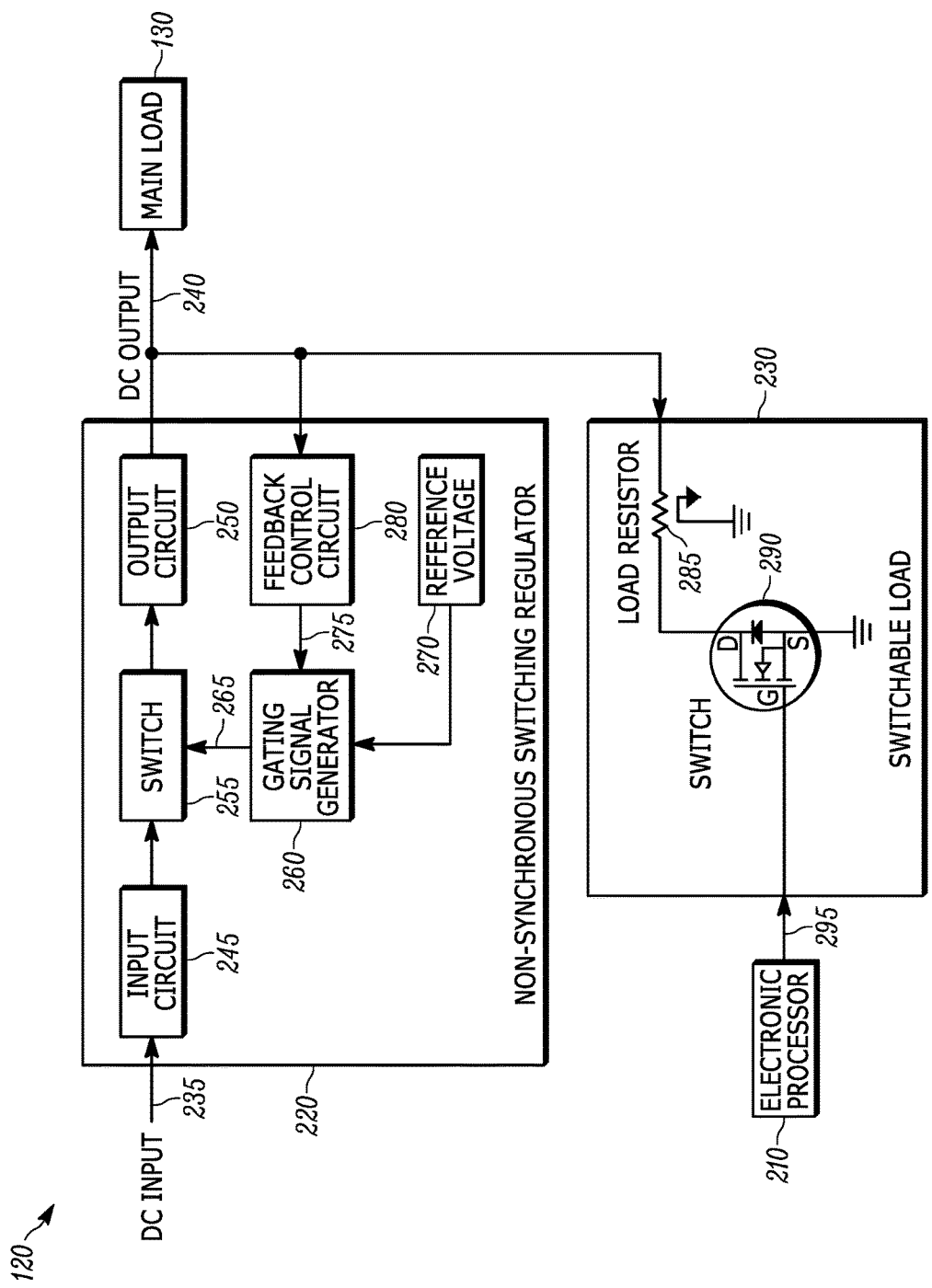
FIG. 2 is a block diagram of a voltage regulator and a main load of the electronic device of FIG. 1 in accordance with some embodiments.

FIG. 2 is a block diagram of one embodiment of a voltage regulator 120 and a main load 130. In the example illustrated, the voltage regulator 120 includes an electronic processor 210, a non-synchronous switching regulator 220, and a switchable load 230. The voltage regulator 120 may include more or fewer components and may perform additional functions other than those described herein.

In some embodiments, the electronic processor 210 is implemented as microprocessor with a separate memory. In other embodiments, the electronic processor 210 may be implemented as a microcontroller (with a memory on the same chip). In other embodiments, the electronic processor 210 may be implemented using multiple processors. In addition, the electronic processor 210 may be implemented partially or entirely as, for example, a field-programmable gate array (FPGA), an application specific integrated circuit (ASIC), and the like and a memory may not be needed or be modified accordingly.

The non-synchronous switching regulator 220 provides a voltage supply to the main load 130. The non-synchronous switching regulator 220 receives a direct-current (DC) input 235 from the power source 110 (see FIG. 1) and provides a direct-current output 240 to the main load 130. The non-synchronous switching regulator 220 may be a DC-DC boost converter (that is, output voltage is higher than input voltage), a DC-DC buck converter (that is, output voltage is lower than input voltage), or both such that the voltage is boosted in some instances and bucked in other instances. The non-synchronous switching regulator 220 includes an input circuit 245 receiving the direct-current input 235, an output circuit 250 providing the direct-current output 240, and a switch 255 connected between the input circuit 245 and the output circuit 250. The input circuit 245 and the output circuit 250 may be one selected from a group consisting of a resonant (LC) circuit and a shunt capacitor circuit. The LC circuit filters an input or an output of the switching regulator 220 and the shunt capacitor circuit acts as a charge reservoir for the DC-DC conversion. For example, when the switching regulator 220 is a DC-DC boost converter, the input circuit 245 is an LC circuit and the output circuit 250 is a shunt capacitor circuit. The input circuit 245 in the boost converter filters the direct-current input 235 and the output circuit 250 provides the charge reservoir to up-convert the DC voltage to a higher direct-current output 240. When the switching regulator 220 is a DC-DC buck converter, the input circuit 245 is a shunt capacitor circuit and the output circuit is an LC circuit. The input circuit 245 in the buck converter provides the charge reservoir to down-convert the direct-current input 235 and the output circuit 250 provides a filtered direct-current output 240. When the switch 255 is closed, power from the input circuit 245 is provided to the output circuit 250. On the other hand, when the switch 255 is open, power from the input circuit 245 is not provided to the output circuit 250.

The non-synchronous switching regulator 220 includes a gating signal generator 260 that provides a control signal 265 for controlling the switch 255 to open and close. The gating signal generator 260 receives a reference voltage 270 (for example, from a voltage reference) and a feedback signal 275 from a feedback control circuit 280. The feedback control circuit 280 receives the direct-current output 240 and provides the feedback signal 275 to the gating signal generator 260. The gating signal generator 260 provides the control signal 265 based on the feedback signal 275.

The switchable load 230 includes a resistive load 285 and a load switch 290. The load switch 290 provides a current path through the resistive load 285 for the non-synchronous switching regulator 220 when closed. The load switch 290 receives a load control signal 295 (for example, a control input) from the electronic processor 210. The electronic processor 210 controls the load switch 290 to open and close using the load control signal 295.

As described above, the main load 130 (for example, the component) varies between an unloaded state (for example, a no-load state or an almost no-load state) to a loaded state (for example, a partial load state or a full load state). During periods where the main load 130 is in the unloaded state, the non-synchronous switching regulator 220 may open the switch 255 and go into a sleep (for example, single-phase operation) mode to conserve energy and to increase power transfer efficiency. The non-synchronous switching regulator 220 may enter an active mode when the loaded state is detected at the main load 130 to provide operating voltage (for example, multi-phase operation) at the direct-current output 240 to the main load 130. More particularly, in the active mode the gating signal generator 260 provides the control signal 265 to control switching of the switch 255 to provide the desired direct current output 240.

Figure 5:
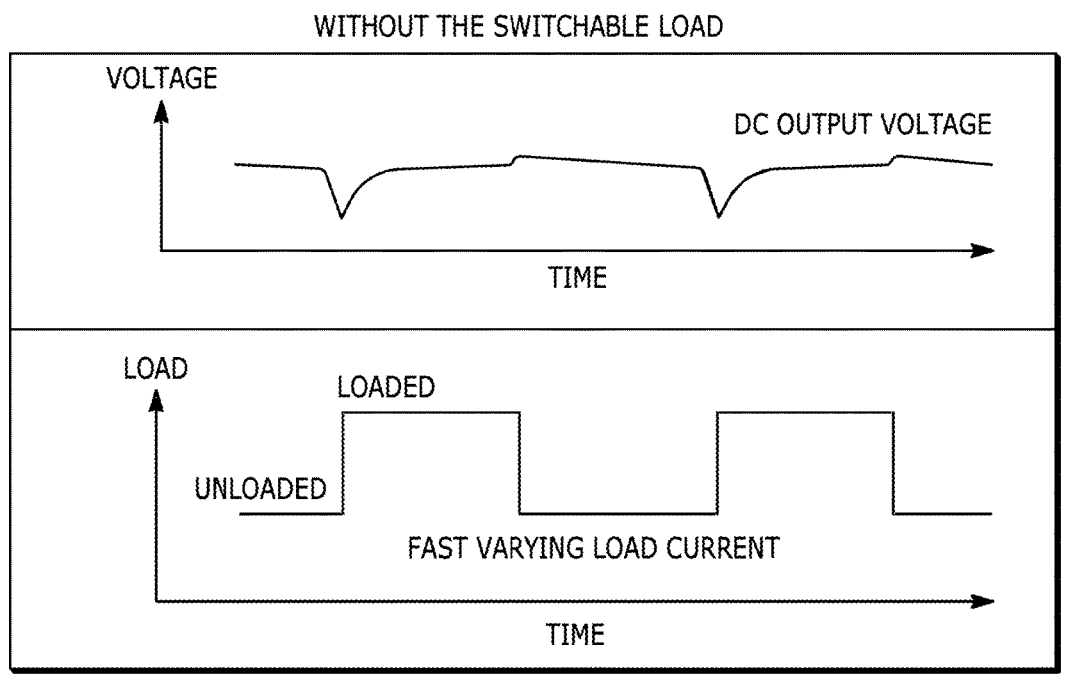
FIG. 5 is a graph illustrating one example situation where the switching regulator of FIG. 2 does not maintain output voltage regulation in the absence of a switchable load.

The switching speed at which the main load 130 varies between the load states depends on the type of the main load 130. In some embodiments, the switching speed may be faster than the response time of the non-synchronous switching regulator 220. That is, the main load 130 may switch between the unloaded state and the loaded state faster than the non-synchronous switching regulator 220 may go from a sleep mode, controlling switching of the switch 255, and provide the desired operating direct-current voltage at the direct-current output 240. The switchable load 230, as described in further detail below, is controlled to improve the response time of the non-synchronous switching regulator 220 to provide consistent, regulated direct current voltage to the main load 130. In some embodiments, the non-synchronous switching regulator 220 may enter the sleep mode just when the main load 130 is switching between the unloaded state and the loaded state. In these embodiments, the main load 130 may switch between the load states faster than the non-synchronous switching regulator 220 can detect the switching of the main load 130 and entering the active mode from the sleep mode. As such, the main load 130 may lose regulation regulated direct current voltage input from the direct current output 240. FIG. 5 illustrates one example output of the non-synchronous switching regulator 220 without the switchable load 230 where the non-synchronous switching regulator 220 does not maintain output voltage regulation for fast switching main load 130.

Figure 3:
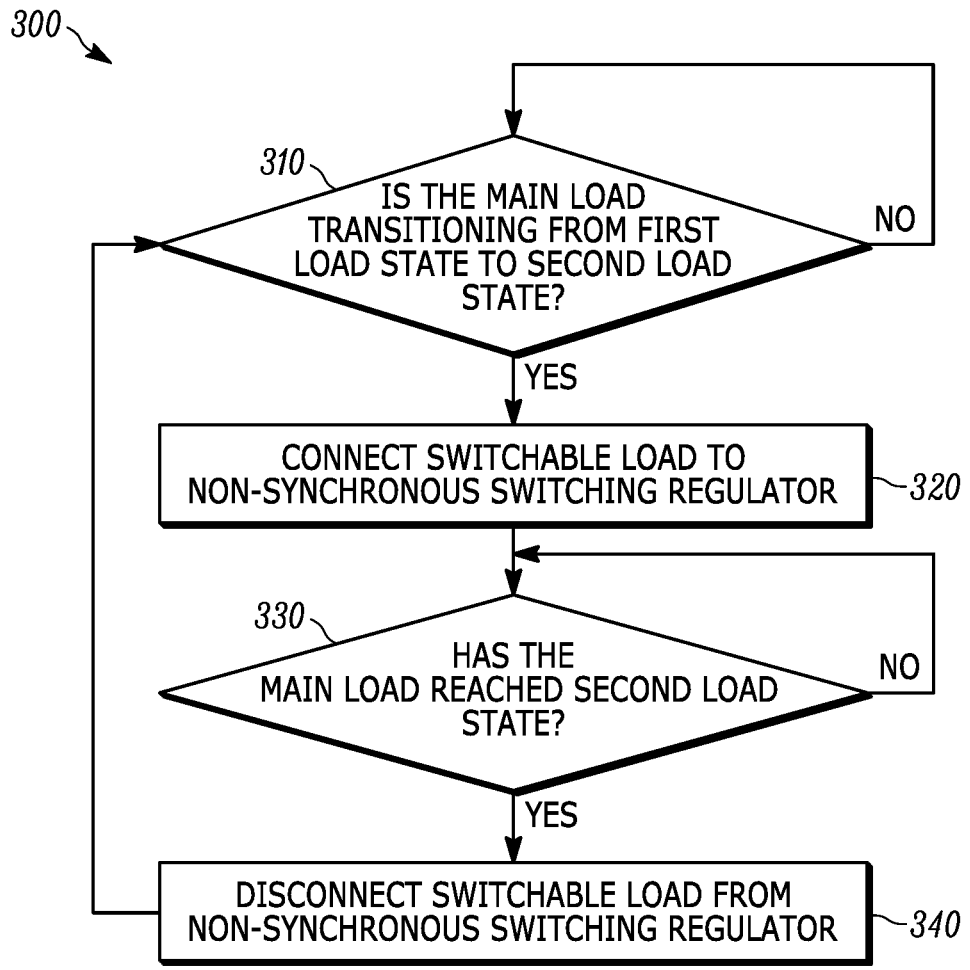
FIG. 3 is a flowchart of a method for maintaining output voltage regulation of a non-synchronous switching regulator of the voltage regulator of FIG. 2 in accordance with some embodiments.

FIG. 3 is a flowchart illustrating one example method 300 for maintaining output voltage regulation of the non-synchronous switching regulator 220. As illustrated in FIG. 3, the method 300 includes determining, using the electronic processor 210, whether the main load 130 is transitioning from a first load state to a second load state (at block 310). The electronic processor 210 may be connected to and controls the main load 130. Accordingly, the electronic processor 210 may determine when the main load 130 is switching between the first load state and the second load state. For example, in mobile and portable two-way radios, the main load 130 may be a time-division multiple access transmitter. In these embodiments, the electronic processor 210 may determine that the main load 130 (that is, the transmitter) is switching between the unloaded state and the loaded state when the two-way radio is about to transmit data to a base station or when the two-way radio is switching from a receiving state to a transmitting state. In other embodiments, the main load 130 may communicate to the electronic processor 210 when the main load 130 is switching from the first load state to the second load state.

In some embodiments, the first load state may be the unloaded state and the second load state may be the loaded state. The non-synchronous switching regulator 220 may determine that the main load 130 is in the first load state when the main load 130 is operating below a first load threshold and may determine that the main load 130 is in the second load state when the main load 130 is operating above a second load threshold. In these embodiments, the first load threshold is lower than the second load threshold. In some embodiments, the first load state may be the loaded state and the second load state may be the unloaded state. The non-synchronous switching regulator 220 may determine that the main load 130 is in the first load state when the main load 130 is operating above a first load threshold and may determine that the main load 130 is in the second load state when the main load 130 is operating below a second load threshold. In these embodiments, the first load threshold is greater than the second load threshold.

The method 300 includes connecting, using the electronic processor 210, the switchable load 230 to the non-synchronous switching regulator 220 (at block 320) in response to determining that the main load 130 is transitioning from the first load state to the second load state. The electronic processor 210 may close the load switch 290 to connect the resistive load 285 between the non-synchronous switching regulator 220 and ground. The switchable load 230 is connected to the non-synchronous switching regulator 220 before the main load 130 transitions from the first load state to the second load state. Connecting the resistive load 285, and therefore the switchable load 230, to the non-synchronous switching regulator 220 prevents the switching regulator from entering the sleep mode during or just before the main load 130 transitioning between the first load state and the second load state. In addition, connecting the resistive load 285 wakes up the non-synchronous switching regulator 220 (that is, forces the non-synchronous switching regulator 220 to an active mode) when the non-synchronous switching regulator 220 is in the sleep mode before the main load 130 transitioning between the first load state and the second load state. Block 310 and block 320 are also referred to as a pre-loading operation of the non-synchronous switching regulator 220 (for example, see block 460 of method 400 of FIG. 4).

The method 300 also includes determining, using the electronic processor 210, whether the main load 130 has reached the second load state (at block 330). Continuing with the two-way radio example above (see block 310), the electronic processor 210 may determine that the main load 130 (that is, the transmitter) has reached the second load state when the two-way radio is in a transmitting state. The electronic processor 210 may continuously monitor to determine whether the main load 130 has reached the second load state.

Figure 6:
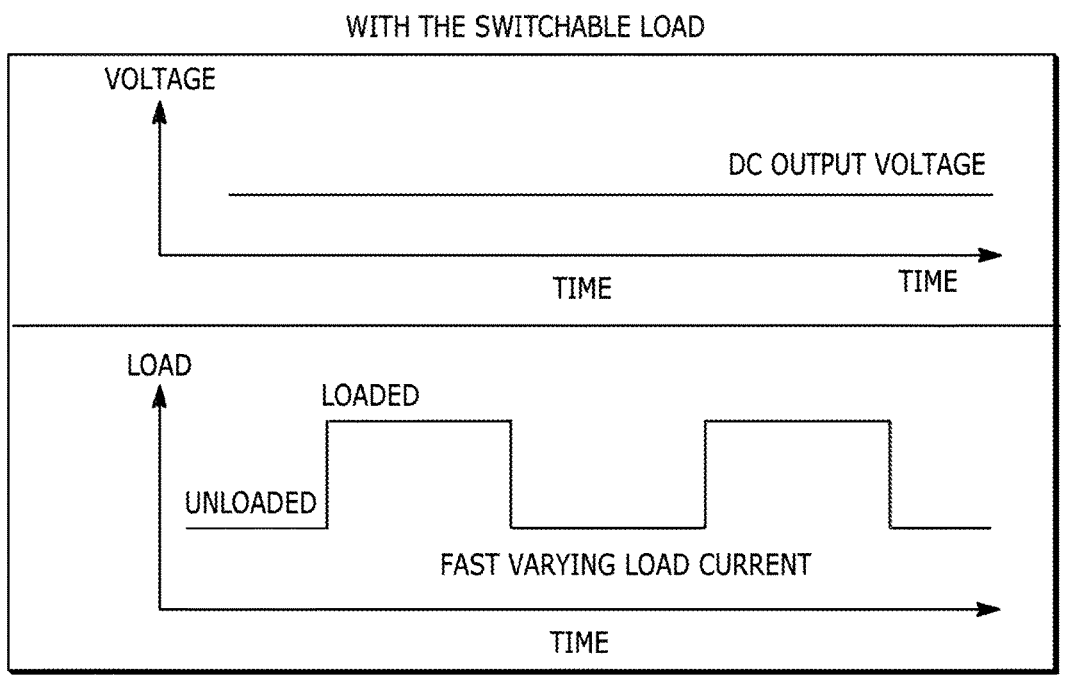
FIG. 6 is a graph illustrating one example situation where the switching regulator of FIG. 2 maintains output voltage regulation in accordance with some embodiments.

The method 300 includes disconnecting the switchable load 230 from the non-synchronous switching regulator 220 (at block 340) in response to determining that the main load 130 has reached the second load state and before the main load 130 transitions from the first load state to the second load state. The electronic processor 210 may open the load switch 290 to disconnect the resistive load 285 from the non-synchronous switching regulator 220. Accordingly, the method 300 maintains output voltage regulation of the non-synchronous switching regulator 220. Block 330 and block 340 define an unloading operation of the non-synchronous switching regulator 220. FIG. 6 illustrates one example output of the non-synchronous switching regulator 220 implementing the method 300.

Figure 4:
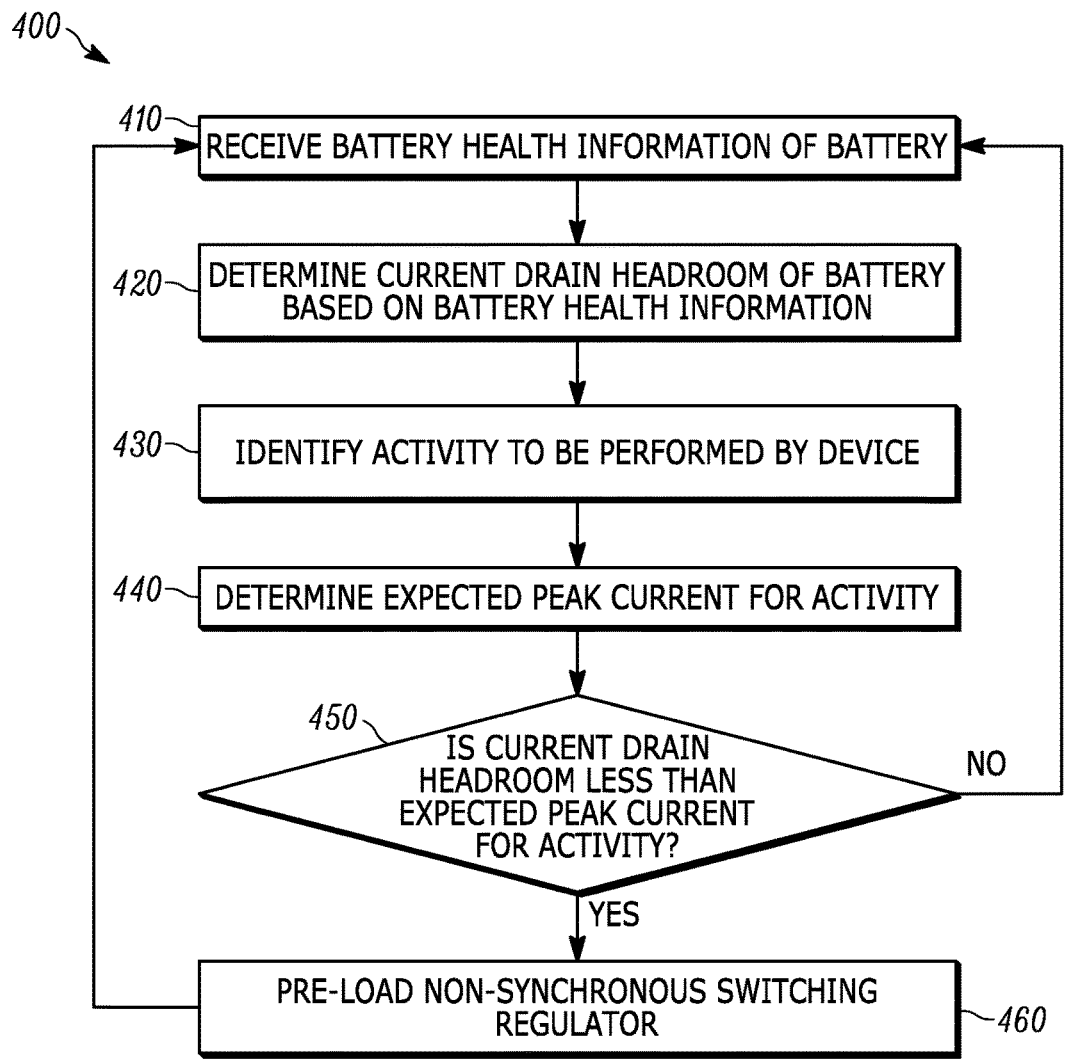
FIG. 4 is a flowchart of a method for maintaining output voltage regulation of a non-synchronous switching regulator of the voltage regulator of FIG. 2 in accordance with some embodiments.

Batteries, as opposed to AC power sources or vehicle batteries coupled to alternators, have finite energy levels. FIG. 4 is a flowchart illustrating one example method 400 for maintaining output voltage regulation of the non-synchronous switching regulator 220 that takes battery health into consideration. As illustrated in FIG. 4, the method 400 includes receiving, at the electronic processor 210, battery health information of the battery (that is, the power source 110) (at block 410). The electronic processor 210 may receive battery health information from a fuel gauge and/or a battery electronic processor of a battery pack including the battery. The battery health information includes, for example, a temperature of the battery, an age of the battery, a state of charge of the battery, an internal resistance of the battery, an estimated cell pack voltage of the battery pack including the battery, historical usage statistics of the battery, and the like.

The method 400 also includes determining, using the electronic processor 210, a current drain headroom of the battery based on the battery health information (at block 420). The current drain headroom is the capacity of the battery to handle a peak current discharge activity. That is, the current drain headroom is the maximum peak current the battery can handle without entering a failed state. For example, the electronic processor 210 may determine the current drain headroom based on the state of charge and the internal resistance of the battery. In some embodiments, the electronic processor 210 may determine the current drain headroom based on a capacity of the battery.

The method 400 further includes identifying, using the electronic processor 210, an activity to be performed by the electronic device 100 (at block 430). As described above the electronic device 100 includes the non-synchronous switching regulator 220 and the main load 130. The activity to be performed is, for example, an activity to be performed by the main load 130. The electronic processor 210 may determine the activity to be performed based on the functional requirements of the electronic device 100, based on a user input, or both. In one example, the electronic device 100, such as a two-way radio, may have a functional requirement to provide a global positioning system (GPS) coordinates to a base station at regular intervals. Accordingly, the electronic processor 210 may identify providing global positioning system coordinates as an activity to be performed by the electronic device 100. In another example, the electronic processor 210 may determine that a portable two-way radio will be transmitting data when a user presses a push-to-talk button on the portable two-way radio. In yet another example, processes of the electronic device 100 that are active may have their identification information stored on a software stack of the electronic processor 210. Accordingly, the electronic processor 210 may identify the activity to be performed by referring to the software stack.

The method 400 also includes determining, using the electronic processor 210, an expected peak current for the activity (at block 440). The electronic processor 210 may determine the expected current for the activity based on, for example, a look-up table stored on a memory of the electronic device 100 having a list of activities and corresponding expected peak current amounts, historical activity information stored on the memory of the electronic device 100, calculations based on power requirements of components of the electronic device 100, or the like. In another example, the look-up table may also store a mapping between identification information of the activity and the expected peak current amounts for the activity. The expected peak current for the activity may be a peak current draw by the main load 130, for example, due to switching transients in the switching regulator 220.

The method 400 further includes determining, using the electronic processor 210, whether the current drain headroom is less than the expected peak current for the activity (at block 450). To make the determination, the electronic processor 210 compares the current drain headroom determined at block 420 with the expected peak current for the activity determined at block 440.

The method 400 includes pre-loading, using the electronic processor 210, the non-synchronous switching regulator 220 (at block 460) in response to determining that the current drain headroom is less than the expected peak current for the activity. As described above, pre-loading includes determining that a main load 130 is transitioning from the first load state to a second load state (block 310 of FIG. 3) and connecting the switchable load 230 to the non-synchronous switching regulator 220 (block 320 of FIG. 3). However, when the current drain headroom is determined to be greater than the expected peak current for the activity at block 450, the electronic processor 210 does not pre-load the non-synchronous switching regulator 220. Rather, the method 400 returns to block 410 and the electronic processor 210 again receives battery health information. The electronic processor 210 continues to execute the method 400 to check the battery health information to determine whether or not to pre-load the non-synchronous switching regulator 220.

The voltage regulator 120 with switchable load 230 provides faster response times and more constant DC output voltages than switching regulators having comparable sized inductors (e.g., within the input circuit 245 or the output circuit 250) without the switchable load. Accordingly, the non-synchronous switching regulator 220 can be implemented with relatively small inductors and without the addition of large inductors, which can be difficult to mount via automated surface mount technology, prone to damage at solder joints during vibration, and occupy large amounts of space. Additionally, the voltage regulator 120 with switchable load 230 provides a lower current draw than a synchronous switching regulator designed to address similar switching times. The switchable load 230 also provides high switching frequency able to maintain high efficiency under fast varying load conditions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for maintaining output voltage regulation of a non-synchronous switching regulator providing a voltage supply to a main load, the method comprising:
   receiving, at an electronic processor, battery health information of a battery;
   determining, using the electronic processor, a current drain headroom of the battery based on the battery health information;
   identifying, using the electronic processor, an activity to be performed by a device coupled to the battery, the device including the non-synchronous switching regulator and the main load;
   determining, using the electronic processor, an expected peak current for the activity;
   determining, using the electronic processor, that the current drain headroom is less than the expected peak current for the activity; and
   pre-loading, using the electronic processor, the non-synchronous switching regulator in response to determining that the current drain headroom is less than the expected peak current for the activity.

2. The method of claim 1, wherein pre-loading the non-synchronous switching regulator comprises:
   determining that the main load is transitioning from a first load state to a second load state; and
   connecting a switchable load to an output of the non-synchronous switching regulator in response to determining that the main load is transitioning from the first load state to the second load state and before the main load transitions from the first load state to the second load state, wherein the switchable load is external to the non-synchronous regulator.

3. The method of claim 2, further comprising:
   determining that the main load has reached the second load state; and
   disconnecting the switchable load from the output of the non-synchronous switching regulator in response to determining that the main load has reached the second load state.

4. The method of claim 3, wherein the first load state is when the main load is operating below a first load threshold, wherein the second load state is when the main load is operating above a second load threshold, and wherein the first load threshold is lower than the second load threshold.

5. The method of claim 3, wherein the first load state is when the main load is operating above a first load threshold, wherein the second load state is when the main load is operating below a second load threshold, and wherein the first load threshold is greater than the second load threshold.

6. The method of claim 1, wherein the main load is a time-division multiple access (TDMA) radio frequency (RF) transmitter.

* * * * *